(12) United States Patent
Choi

(10) Patent No.: US 7,988,592 B2
(45) Date of Patent: Aug. 2, 2011

(54) METHOD FOR CONTROLLING IDLE STOP MODE IN HYBRID ELECTRIC VEHICLE

(75) Inventor: Yong Kak Choi, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 885 days.

(21) Appl. No.: 12/005,797

(22) Filed: Dec. 28, 2007

(65) Prior Publication Data

US 2009/0062062 A1    Mar. 5, 2009

(30) Foreign Application Priority Data

Sep. 5, 2007 (KR) .................. 10-2007-0089880

(51) Int. Cl.
*B60K 1/02* (2006.01)

(52) U.S. Cl. .......................................................... 477/3
(58) Field of Classification Search ...................... 477/3
See application file for complete search history.

(56) References Cited

FOREIGN PATENT DOCUMENTS

| JP | 11-270377 | 10/1999 |
|---|---|---|
| JP | 2000-205122 | 7/2000 |
| JP | 2003-176738 | 6/2003 |
| JP | 2003-278911 | 10/2003 |

*Primary Examiner* — Dirk Wright
(74) *Attorney, Agent, or Firm* — Edwards Angell Palmer & Dodge LLP; Peter F. Corless

(57) ABSTRACT

A method for controlling an idle stop mode in a hybrid electric vehicle is disclosed. The control method accords an oil pressure drain time that a continuously variable transmission clutch oil pressure is fully drained, a final off time of an engine, and a final control time of a motor when a hybrid electric vehicle enters an idle stop mode, thereby preventing a shock or shaking of the vehicle.

2 Claims, 4 Drawing Sheets

METHOD FOR CONTROLLING IDLE STOP MODE IN HYBRID ELECTRIC VEHICLE

CROSS-REFERENCE TO RELATED APPLICATION

This application claims the benefit under 35 U.S.C. §119(a) on Korean Patent Application No. 10-2007-0089880 filed on Sep. 5, 2007, the entire contents of which are incorporated herein by reference.

BACKGROUND

1. Technical Field

The present invention relates to a method for controlling an idle stop mode in a hybrid electric vehicle, and more particularly, to a method for controlling an idle stop mode in a hybrid electric vehicle in which when an idle stop mode is triggered in a hybrid electric vehicle, in order to accord final control times of an engine, a motor and a continuously variable transmission (CVT), a hybrid control units transmits an idle stop mode triggering signal for a CVT clutch to a transmission control unit (TCU) in advance so that the CVT clutch can be opened in advance, thereby preventing a shock or shaking of the vehicle.

2. Background Art

A typical hybrid electric vehicle, as shown in FIG. 2, comprises an inverter 10, a DC/DC converter 20, a high voltage battery 30, a hybrid control unit (HCU) 40, a motor control unit (MCU) 50, a battery management system (BMS) 60, an engine control unit (ECU) 70, a TCU 80, a clutch and a CVT 90, an engine 100, and a motor 200. The engine 100 and the motor 200 are serially connected to each other and serve as a power source for driving a vehicle. The clutch and CVT 90 serve to transfer a power. The inverter 10, the DC/DC converter 20, and the high voltage battery 30 serve to drive the engine 100 and the motor 200. The HCU 40, MCU 50, BMS 60, ECU 70, and TCU 80 serve as means for controlling the above-described components and are connected to communicate with each other through controller area network (CAN) communications.

Functions of the components of the hybrid electric vehicle are described below.

The HCU 40 is an upper-level controller which controls an overall operation of a hybrid electric vehicle. The HCU 40 communicates with the MCU 50, which is a sort of a low-level controller, to control torque, speed and power-generation torque of the motor and communicates with the ECU 70, which controls the engine for generating a power for voltage generation as a power source, to perform an engine starting-related relay control operation and a failure diagnosis operation.

The HCU 40 also communicates with the BMS 60, which manages an overall state of a battery by detecting a temperature, a voltage, an electrical current, a state of charge (SOC) of a battery which is a main power source, to control torque and speed of the motor according to the SOC. The HCU 40 also communicates with the TCU 80, which determines and controls a transmission gear ratio according to a vehicle speed and a demand of a driver, to perform a control operation for maintaining a vehicle speed required by a driver.

The HCU 40 monitors information (accelerator or brake) requested by a driver and current states of the MCU, BMS, ECU, and TCU to control an output voltage of the DC/DC converter so that energy can be efficiently distributed according to a vehicle state. Here, the DC/DC converter 20 serves to have a power to be supplied for a vehicle electrical equipment load and a 12V battery to be efficiently charged.

The high voltage battery 30 is an energy source for driving the motor and the DC/DC converter 20 of the hybrid electric vehicle. The BMS 60 which is a controller of the high voltage battery 30 monitors a voltage, an electrical current and a temperature of the high voltage battery 30 to control the SOC (%) of the high voltage battery 30.

The inverter 10 receives energy from the high voltage battery to supply a three-phase alternating current necessary for driving the motor, and the MCU 50 controls the motor under control of the HCU 40.

In connection with control of the DC/DC converter 20, the ECU 70 and the TCU 80 receives an accelerator pedal effort and a brake signal of a driver and provides related information to the HCU 40, which is an upper-level controller, to determine vehicle charging energy.

As an accelerating pedal, i.e., accelerator, a hybrid electric vehicle usually uses an electronic throttle control (ETC) type, and when a driver pushes an accelerating pedal, it is converted into a driver requesting torque form, so that torque suitable for a vehicle speed is determined.

That is, the driver requesting torque is set to a mapping value of a vehicle speed and a detecting value of an accelerating pedal, and operating points of the motor, the generator and the engine are determined according to the determined driver requesting torque.

One of main purposes of such a hybrid electric vehicle is to realize a high efficiency vehicle with a high fuel consumption ratio and an eco-friendly vehicle with high emission performance.

In order to achieve the above purpose, a hybrid electric vehicle employs an idle stop mode. Here, the idle stop mode represents a function for stopping idling of the engine when a vehicle stops. Due to the idle stop mode, unnecessary idling of the engine is prevented, thereby improving a fuel consumption ratio and emission performance.

The power of the engine and the motor is transmitted to a vehicle through a transmission, i.e., CVT. In order to stably trigger the idle stop mode, the clutch, the engine and the motor should be organically controlled.

That is, the engine, motor and CVT should be perfectly accorded if the idle stop mode can be attained without causing a shock or shaking of a vehicle. Particularly, the idle stop mode is greatly affected by an oil temperature of the CVT, a cooling water temperature of the engine, and a deceleration.

In order to trigger the idle stop mode, when HCU 40 transmits the idle stop mode triggering signal to the ECU, the TCU and a full auto temperature control (FATC), the TCU opens the clutch to prevent the power of the engine and the motor from being transmitted to a vehicle, and the ECU turns off an engine to prevent the power of the engine from being transmitted. At this time, the HCU transmits a signal to the MCU to have kill torque to be generated in the motor, so that remaining torque of the engine and the motor is removed, whereby the idle stop mode is completely entered.

However, when the hybrid electric vehicle enters the idle stop mode, the vehicle should decelerate and stop linearly and quietly, but a shaking suddenly occurs, and so a driver does not feel a linear deceleration but alienated. That is, a driver experiences unexpected deceleration feeling (i.e., drag feeling), thereby deteriorating a commodity of a hybrid electric vehicle.

As shown in an operation profile graph of FIG. 4, when the idle stop mode is triggered, motor torque is generated to control the motor until a clutch oil pressure is released, and as the clutch oil pressure does not follow a target pressure, a dip occurs in a P1 speed to affect a vehicle speed, whereby a driver feels alienated due to a shock of a vehicle.

The causes of the above problems are as follows. A vehicle speed for triggering an idle stop mode is determined always at the same vehicle speed, and after an oil pressure of the CVT is opened by a reaction control of the motor, control for triggering the idle stop mode is performed. Therefore, a time when the engine is off and a time when the motor torque is on are not identical, whereby a shock or shaking of a vehicle occurs. In addition, the idle stop mode is triggered without any compensation according to a deceleration, and thus a shock phenomenon gets severe.

Also, a drain time that a clutch oil pressure is fully drained is delayed differently from a target value, thereby causing a shock or a shaking of a vehicle.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the aforementioned problems associated with prior arts and one object of the present invention is to provide a method for controlling an idle stop mode in a hybrid electric vehicle in which a linear stop of a vehicle is realized by according a drain time of a clutch oil pressure, a final stop time of an engine and a final control time of a motor when an idle stop mode is triggered, thereby preventing a shock or a shaking of a vehicle.

In one aspect, the present invention provides a method for controlling an idle stop mode in a hybrid electric vehicle, which accords an oil pressure drain time that a CVT clutch oil pressure is fully drained, a final off time of an engine, and a final control time of a motor when a hybrid electric vehicle enters an idle stop mode.

The control for according the oil pressure drain time, final engine off time, and final motor control time comprises the steps of: generating a signal "I/Stop for TCU" through a map for setting a vehicle speed condition for allowing the entrance of the idle stop mode for the TCU based on information about CVT oil temperature and deceleration; transmitting the signal "I/Stop for TCU" to the TCU from HCU in advance when the hybrid electric vehicle reaches an idle stop mode entrance vehicle speed; opening a CVT clutch in advance by control of the TCU to block an engine power; turning off an engine by ECU in a state that the CVT oil pressure is fully drained at the same time when the CVT clutch is opened; and controlling the motor to generate kill torque by the HCU.

BRIEF DESCRIPTION OF THE DRAWINGS

The above and other features of the present invention will be described in reference to certain exemplary embodiments thereof with reference to the attached drawings in which.

DETAILED DESCRIPTION

Figure 1:
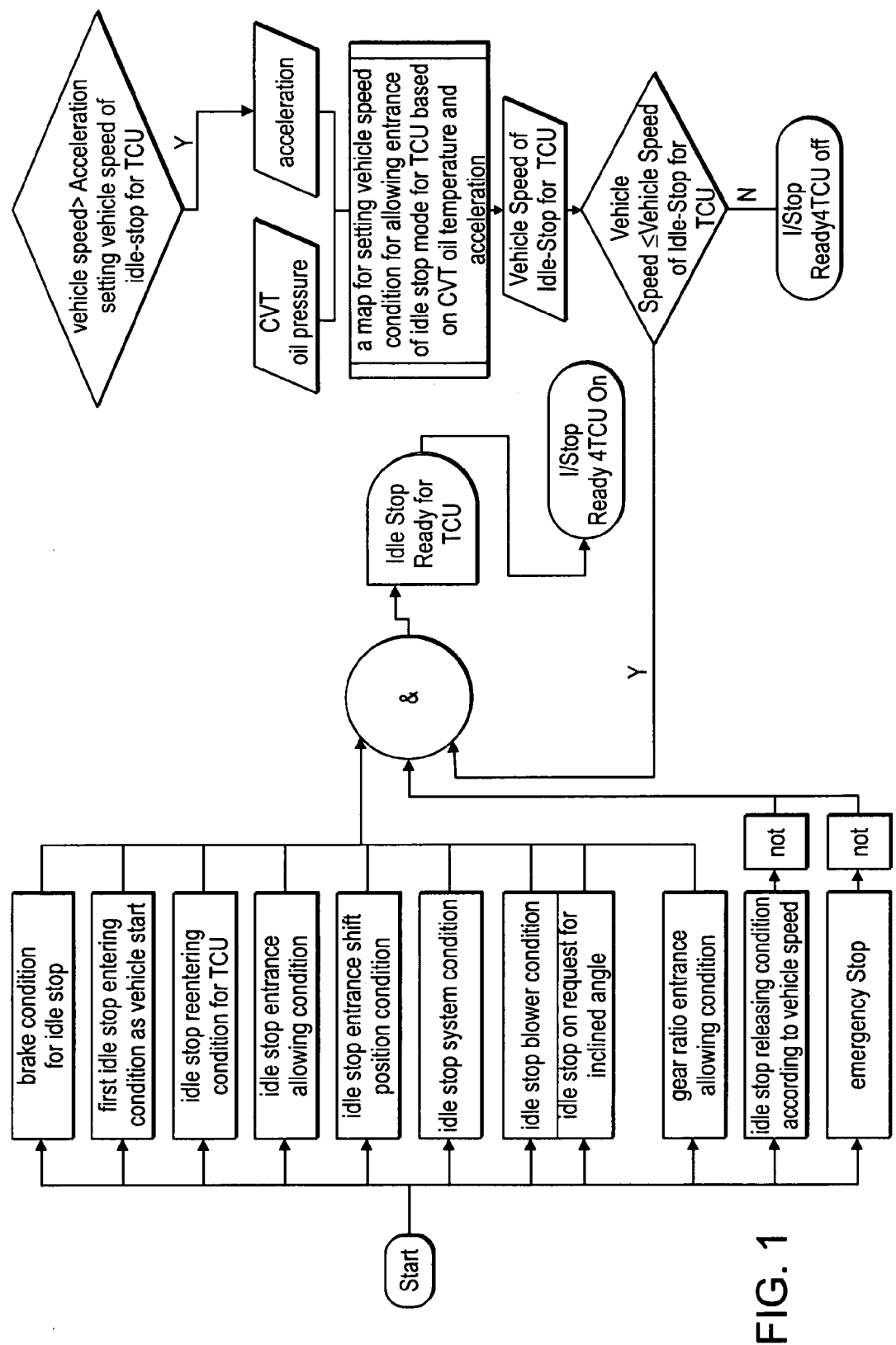
FIG. 1 is a flowchart illustrating a method for controlling an idle stop mode in a hybrid electric vehicle according to an exemplary embodiment of the present invention.
Figure 2:
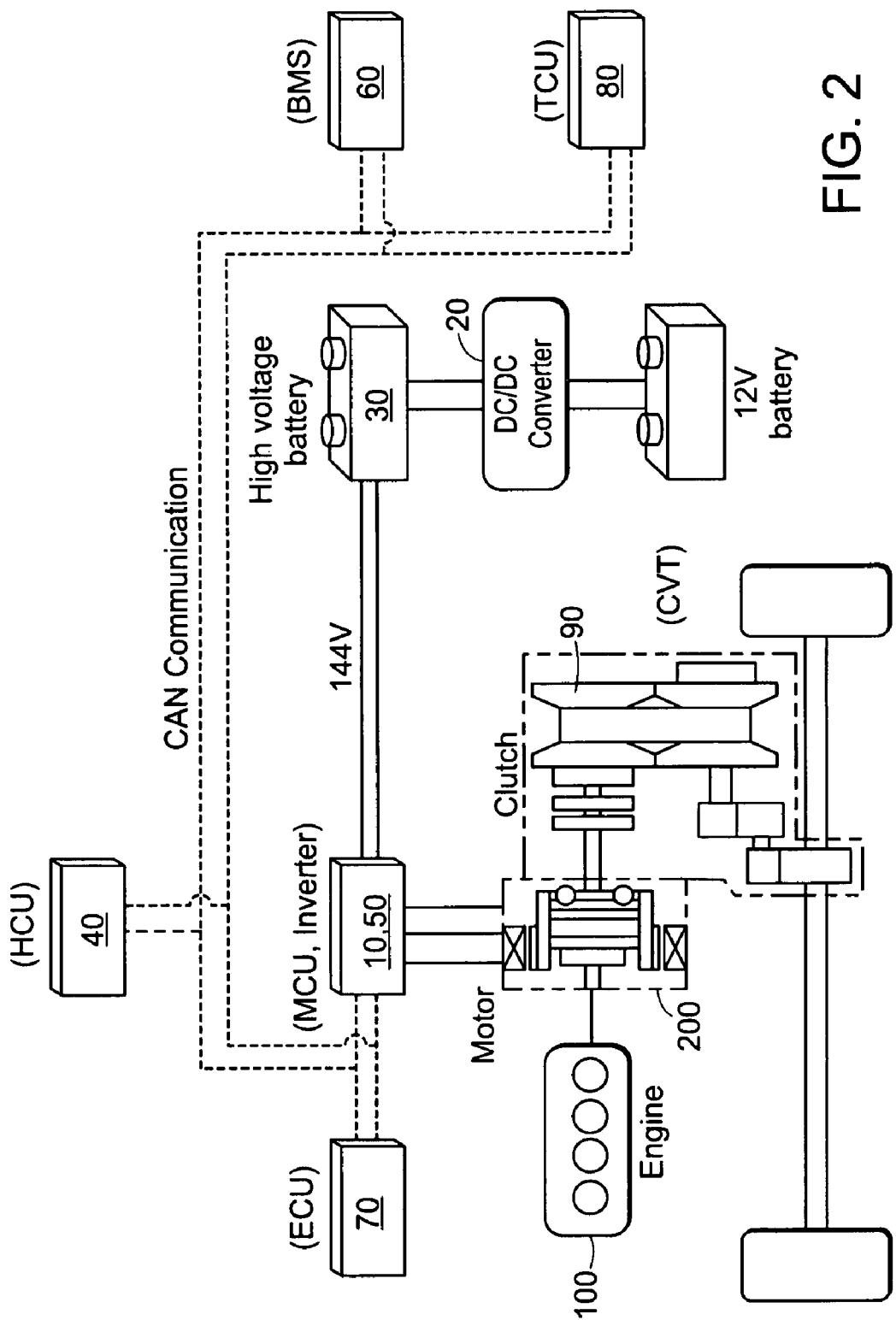
FIG. 2 is a block diagram illustrating a typical hybrid electric vehicle.

Reference will now be made in detail to the embodiments of the present invention, examples of which are illustrated in the accompanying drawings, wherein like reference numerals refer to the like elements throughout. The embodiments are described below in order to explain the present invention by referring to the figures.

As described above, the idle stop mode is a function for stopping idling of the engine when a vehicle stops to thereby improve a fuel consumption ratio. The idle stop mode can be perfectly entered by perfectly according control over the engine, the motor and the CVT.

A typical control operation for entering an idle stop mode includes at an HCU, transmitting an idle stop mode triggering signal to an ECU, a TCU and a FATC, at the TCU, opening a clutch to block a power of an engine and a motor from being supplied to a vehicle, and at the ECU, turning off the engine to block an engine power.

To the contrary, the present invention provides a control method for entering an idle stop mode in a hybrid electric vehicle in which a drain time of a CVT clutch oil pressure, a final stop time of an engine and a final control signal of a motor are accorded or identical to linearly stop a vehicle without a shock or a shaking of a vehicle when the idle stop mode is triggered, thereby improving a consumption ratio of a hybrid electric vehicle.

Figure 3:
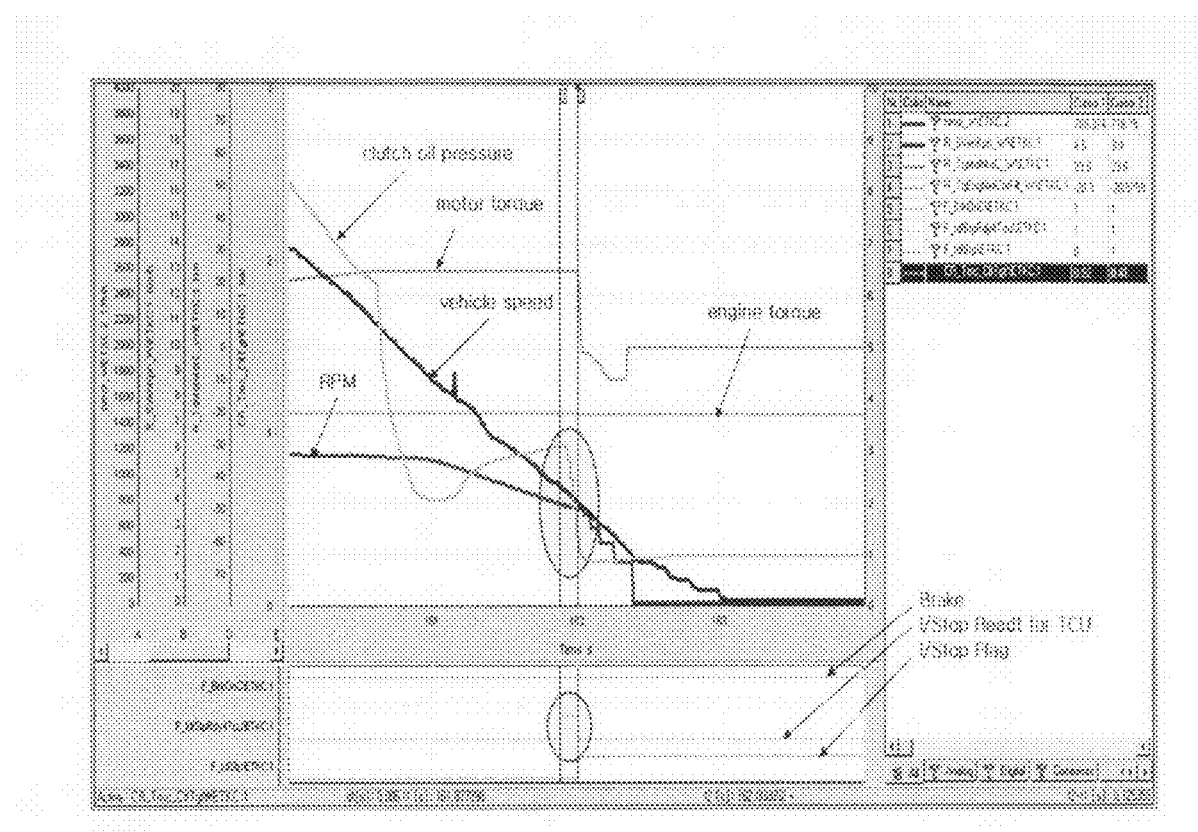
FIG. 3 is a graph illustrating an operation profile of the idle stop mode control method according to the exemplary embodiment of the present invention.
Figure 4:
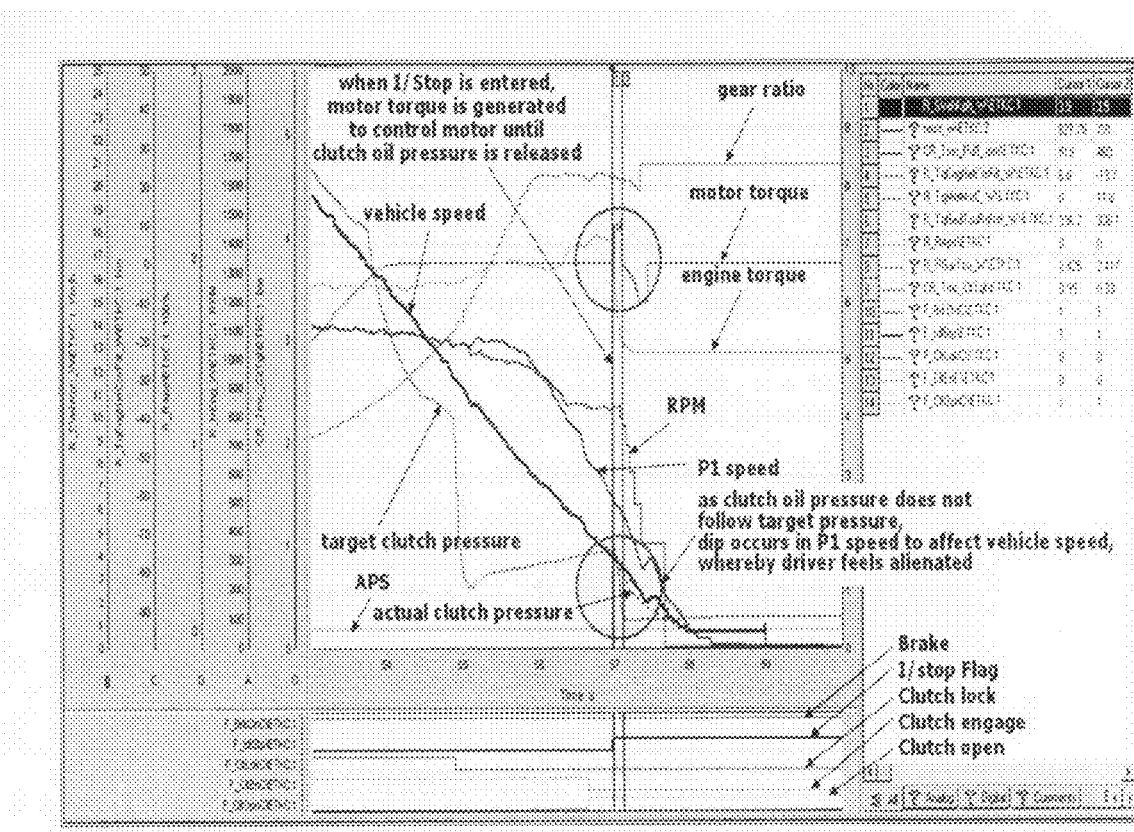
FIG. 4 is a graph illustrating an operation profile of respective factor according to a conventional idle stop mode control method.

FIG. 1 is a flowchart illustrating a method for controlling an idle stop mode in a hybrid electric vehicle according to an exemplary embodiment of the present invention, and FIG. 3 is a graph illustrating an operation profile of the idle stop mode control method according to the exemplary embodiment of the present invention.

According to the present invention, a brake condition for an idle stop, an idle stop entering condition as a vehicle start, an idle stop reentering condition for a TCU, an idle stop entrance allowing condition, an idle stop system condition, an idle stop blower condition, an idle stop response condition for an inclined angle, a gear ratio entrance allowing condition, an idle stop releasing condition according to a vehicle speed, an emergency stop control are same as those in the typical idle stop mode control method, and when a hybrid electric vehicle enters the idle stop mode, a control for perfectly according an oil drain time that an oil pressure of a CVT clutch is fully drained, a final off time of an engine and a final control time of a motor is performed.

First, in a state that the idle stop mode can be entered, in order to generate a discrete signal for the CVT, a signal called "I/Stop for TCU" is generated through a map for setting a vehicle speed condition for allowing the entrance of the idle stop mode for the TCU based on information about CVT oil temperature and deceleration.

When a hybrid electric vehicle reaches an idle stop mode entrance vehicle speed, according to the CVT oil temperature and the deceleration, the signal "I/Stop for TCU" which is a discrete signal for the CVT is transmitted to the TCU from the HCU in advance.

As a result, the clutch of the CVT is opened in advance by control of the TCU, thereby blocking an engine power.

That is, the CVT clutch is first opened when the idle stop mode is triggered. It is because the clutch oil pressure is drained later compared to target control of the oil pressure due to a mechanical reason, and so undesired movement of a vehicle such as a shock or a shaking of a vehicle occurs.

At the same time when the CVT clutch is opened, in a state that the CVT oil pressure is fully drained, the engine is opened by the ECU, and the motor is controlled by kill torque through the HCU.

That is, when the CVT clutch oil pressure is fully drained, the engine is stopped to remove torque to be transmitted to a vehicle, and the motor is controlled by kill torque, thereby preventing a shock or shaking of a vehicle.

As described above, the method for controlling the idle stop mode in the hybrid electric vehicle according to the present invention has the advantages including the following.

In consideration of that the perfect idle stop mode is realized by perfectly according control over the engine, the motor and the CVT, when the hybrid electric vehicle enters the idle stop mode, the CVT clutch is first opened by the discrete idle stop mode triggering signal for the CVT, and so at a time point when the clutch oil pressure is fully drained, the engine stops to remove torque transmitted to a vehicle and to control the motor by kill torque, thereby preventing a shock or a shaking of a vehicle.

Also, the cause of a shock of a vehicle is removed without using a discrete sensor or actuator, thereby preventing a shock or a shaking of a vehicle without additional cost.

Furthermore, control over the motor for the remaining mount of the existing oil pressure is performed by control over kill torque, thereby reducing consumption of energy used to control the motor and improving the fuel consumption ratio.

Although the present invention has been described with reference to certain exemplary embodiments thereof, it will be understood by those skilled in the art that a variety of modifications and variations may be made to the present invention without departing from the spirit or scope of the present invention defined in the appended claims, and their equivalents.

What is claimed is:

1. A method for controlling an idle stop mode in a hybrid electric vehicle, which accords an oil pressure drain time that a continuously variable transmission (CVT) clutch oil pressure is fully drained, a final off time of an engine, and a final control time of a motor when a hybrid electric vehicle enters an idle stop mode.

2. The method of claim 1, wherein the control for according the oil pressure drain time, the final engine off time and the final motor control time comprises the steps of:

generating a signal "I/Stop for a transmission control unit (TCU)" through a map for setting a vehicle speed condition for allowing the entrance of the idle stop mode for the TCU based on information about CVT oil temperature and deceleration;

transmitting the signal "I/Stop for TCU" to the TCU from a hybrid control unit (HCU) in advance when the hybrid electric vehicle reaches an idle stop mode entrance vehicle speed;

opening a CVT clutch in advance by control of the TCU to block an engine power;

turning off an engine by an engine control unit (ECU) in a state that the CVT oil pressure is fully drained at the same time when the CVT clutch is opened; and controlling the motor to generate kill torque by the HCU.

* * * * *